United States Patent
Tokuda et al.

(10) Patent No.: US 11,969,721 B2
(45) Date of Patent: Apr. 30, 2024

(54) METHOD FOR PRODUCING HONEYCOMB STRUCTURE AND METHOD FOR PRODUCING ELECTRICALLY HEATING SUPPORT

(71) Applicant: NGK INSULATORS, LTD., Nagoya (JP)

(72) Inventors: Masahiro Tokuda, Kasugai (JP); Takashi Noro, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 74 days.

(21) Appl. No.: 17/644,836

(22) Filed: Dec. 17, 2021

(65) Prior Publication Data

US 2022/0258149 A1 Aug. 18, 2022

(30) Foreign Application Priority Data

Feb. 18, 2021 (JP) .................................. 2021-024617

(51) Int. Cl.
*B01J 35/04* (2006.01)
*B01J 21/18* (2006.01)
(Continued)

(52) U.S. Cl.
CPC ............... *B01J 35/56* (2024.01); *B01J 21/18* (2013.01); *B01J 37/0009* (2013.01); *B01J 37/08* (2013.01); *H05B 6/62* (2013.01)

(58) Field of Classification Search
CPC ........ B01J 21/18; B01J 35/04; B01J 37/0009; B01J 37/08; B29C 66/7254; B29C 65/04; B29C 35/02; B29C 33/08
See application file for complete search history.

(56) References Cited

U.S. PATENT DOCUMENTS

2008/0115383 A1 5/2008 Nate et al.
2009/0200712 A1* 8/2009 Hayashi ................. C04B 35/64
264/630

(Continued)

FOREIGN PATENT DOCUMENTS

CN 106029226 A 10/2016
CN 108658618 A 10/2018
(Continued)

OTHER PUBLICATIONS

Chinese Office Action (Application No. 2021113602324) dated Feb. 6, 2023.

*Primary Examiner* — Stella K Yi
(74) *Attorney, Agent, or Firm* — BURR PATENT LAW, PLLC (57) ABSTRACT

A method for producing a honeycomb structure includes: a forming step of extruding a forming raw material containing a ceramic raw material mainly based on silicon carbide and metal silicon to obtain a honeycomb formed body, the honeycomb formed body comprising: an outer peripheral wall; and partition walls; a drying step of drying the honeycomb formed body to obtain a honeycomb dried body; and a firing step of firing the honeycomb dried body to obtain a honeycomb fired body. The drying step includes: a first drying step of subjecting the honeycomb formed body to dielectric drying at a frequency of from 2 to 200 MHz so that a moisture scattering rate of the honeycomb formed body after dielectric drying is from 30 to 85%; and a second drying step of subjecting the honeycomb formed body having the moisture scattering rate of from 30 to 85% to hot air drying.

10 Claims, 3 Drawing Sheets

(51) Int. Cl.
*B01J 35/56* (2024.01)
*B01J 37/00* (2006.01)
*B01J 37/08* (2006.01)
*H05B 6/62* (2006.01)

(56) References Cited

U.S. PATENT DOCUMENTS

| | | |
|---|---|---|
| 2009/0235552 A1 | 9/2009 | Takagi et al. |
| 2014/0294688 A1* | 10/2014 | Mase ................ B01D 46/2429 264/618 |
| 2016/0346776 A1 | 12/2016 | Omiya et al. |
| 2018/0283785 A1 | 10/2018 | Okumura |

FOREIGN PATENT DOCUMENTS

| | | |
|---|---|---|
| JP | 2003-285312 A | 10/2003 |
| JP | 2009-226633 A | 10/2009 |
| JP | 5261256 B2 | 8/2013 |

* cited by examiner

METHOD FOR PRODUCING HONEYCOMB STRUCTURE AND METHOD FOR PRODUCING ELECTRICALLY HEATING SUPPORT

FIELD OF THE INVENTION

The present invention relates to a method for producing a honeycomb structure, and a method for producing an electrically heating support.

BACKGROUND OF THE INVENTION

Recently, electrically heating catalysts (EHCs) have been proposed to improve a decrease in exhaust gas purification performance immediately after engine starting. For example, the EHC is configured to connect metal electrodes to a pillar shaped honeycomb structure made of conductive ceramics, and conducting a current to heat the honeycomb structure itself, thereby enabling a temperature to be increased to an activation temperature of the catalyst prior to the engine starting.

The conductive honeycomb structure used in EHC has been produced through a step of drying a honeycomb formed body. However, the following problems have been reported: during the drying of honeycomb formed body, cracking and/or sagging are generated in the honeycomb formed body; quality varies due to uneven temperature distribution within and between the honeycomb formed bodies; and a production efficiency is decreased due to the time required for the drying step. Conventionally, methods for drying the honeycomb formed bodies have been proposed to solve the various problems.

Patent Literature 1 discloses a method for producing a honeycomb body for electric current heating in which the heating portion is composed of a composite material of a metal and ceramics and the honeycomb body has improved crack resistance, wherein the method includes drying a honeycomb formed body in a microwave dryer, further completely drying the honeycomb formed body in a hot air dryer, and then firing the honeycomb formed body.

Patent Literature 2 discloses a method for drying a ceramic formed body, including a step of subjecting an unfired ceramic formed body formed using a ceramic material as a main raw material to dielectric drying, followed by microwave drying, for the purposes of uniformly and efficiently drying the honeycomb formed body while suppressing generation of cracks during the drying of the honeycomb formed body.

Patent Literature 3 discloses a method for drying a honeycomb formed body, including a microwave drying step controlled to a predetermined output, followed by a hot air drying step, in order to suppress bending and deformation of a cross-sectional shape of the honeycomb formed body.

CITATION LIST

Patent Literatures

[Patent Literature 1] Japanese Patent No. 5261256 B
[Patent Literature 2] Japanese Patent Application Publication No. 2009-226633 A
[Patent Literature 3] Japanese Patent Application Publication No. 2003-285312 A

SUMMARY OF THE INVENTION

When microwave drying is used to dry the honeycomb formed body, it is difficult for the microwaves to penetrate to the central portion of the honeycomb formed boy if the honeycomb formed body has a higher moisture content and a lager formed body size. This results in delayed drying in the central portion and difficulty to dry the entire honeycomb formed body at a uniform rate, which may cause a risk that cracking and/or sagging are generated in the honeycomb formed body. Further, the quality of the honeycomb formed body may be degraded due to variations in drying shrinkage rate. Therefore, there is still room for improvement.

Further, a material of the honeycomb structure includes a ceramic raw material containing a silicon carbide-metal silicon composite as a main component. However, when the honeycomb formed body made of the ceramic raw material is dried only by dielectric drying, the temperature irregularity in the honeycomb formed body is increased as the drying progresses because of a higher dielectric constant of silicon carbide than that of water, and the honeycomb formed body becomes over-dried. As a result, the drying shrinkage rate may vary.

The present invention has been made in light of the above circumstances. A problem of the present invention is to provide a method for producing a honeycomb structure and an electrically heating support, which can suppress generation of cracking and/or sagging of a honeycomb formed body, and variations in drying shrinkage rate.

The above problem is solved by the following present invention, and the present invention is specified as follows:

(1) A method for producing a honeycomb structure, the method comprising:

a forming step of extruding a forming raw material containing a ceramic raw material mainly based on silicon carbide and metal silicon to obtain a honeycomb formed body, the honeycomb formed body comprising: an outer peripheral wall; and a partition wall disposed on an inner side of the outer peripheral wall, the partition wall defining a plurality of cells, each of the cells extending from one end face to other end face to form a flow path;

a drying step of drying the honeycomb formed body to obtain a honeycomb dried body; and a firing step of firing the honeycomb dried body to obtain a honeycomb fired body, wherein the drying step comprises:

a first drying step of subjecting the honeycomb formed body to dielectric drying at a frequency of from 2 to 200 MHz so that a moisture scattering rate of a honeycomb formed body after dielectric drying is from 30 to 85%; and after the first drying step, a second drying step of subjecting a honeycomb formed body having the moisture scattering rate of from 30 to 85% to hot air drying.

(2) The method for producing a honeycomb structure according to (1), wherein the method for the honeycomb structure further comprises a step of preparing a honeycomb dried body with unfired electrode portions by applying an electrode portion forming raw material containing a ceramic raw material to a side surface of the honeycomb dried body, and drying it to form a pair of unfired electrode portions on an outer surface of the outer peripheral wall across a central axis of the honeycomb dried body so as to extend in a form of strip in a flow path direction of the cells, wherein the firing step is a step of firing the honeycomb dried body with unfired electrode portions to obtain a honeycomb structure having a pair of electrode portions.

(3) A method for producing an electrically heating support, the method comprising a step of electrically connecting a metal electrode to each of the pair of electrode portions of the honeycomb structure produced by the method according to (2).

According to the present invention, it is possible to provide a method for producing a honeycomb structure and an electrically heating support, which can suppress generation of cracking and/or sagging of a honeycomb formed body, and variations in drying shrinkage rate.

DETAILED DESCRIPTION OF THE INVENTION

Hereinafter, embodiments according to the present invention will be specifically described with reference to the drawings. It is to understand that the present invention is not limited to the following embodiments, and various design modifications and improvements may be made based on ordinary knowledge of a person skilled in the art, without departing from the spirit of the present invention.

(1. Honeycomb Structure)

Figure 1:
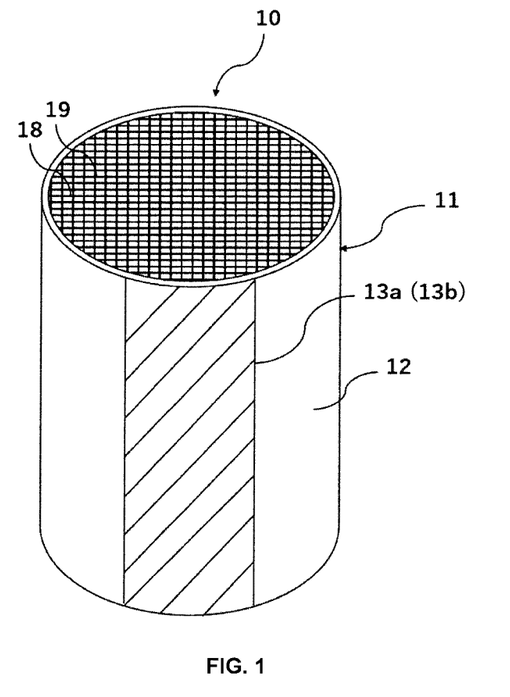
FIG. 1 is a schematic external view of a honeycomb structure according to an embodiment of the present invention.

FIG. 1 is a schematic external view of a honeycomb structure 10 according to an embodiment of the present invention. The honeycomb structure 10 includes a pillar shaped honeycomb structure portion 11 and electrode portions 13a, 13b. The honeycomb structure 10 may not include the electrode portions 13a, 13b.

(1-1. Pillar Shaped Honeycomb Structure Portion)

The pillar shaped honeycomb structure partition 11 includes: an outer peripheral wall 12; and partition walls 19 which are disposed on an inner side of the outer peripheral wall 12 and define a plurality of cells 18 each extending from one end face to other end face to form a flow path.

An outer shape of the pillar shaped honeycomb structure portion 11 is not particularly limited as long as it is pillar shaped. For example, the honeycomb structure portion can have a shape such as a pillar shape with circular end faces (cylindrical shape), a pillar shape with oval end faces and a pillar shape with polygonal (quadrangular, pentagonal, hexagonal, heptagonal, octagonal, etc.) end faces. The size of the pillar shaped honeycomb structure portion 11 is such that an area of the end faces is preferably from 2000 to 20000 $mm^2$, and more preferably from 5000 to 15000 $mm^2$, for the purpose of improving heat resistance (suppressing cracks entering the outer peripheral wall in a circumferential direction).

The pillar shaped honeycomb structure portion 11 is made of ceramics mainly based on a silicon carbide-metal silicon composite. The ceramics mainly based on the silicon carbide-metal silicon composite can achieve both heat resistant and electrical conductivity. The phrase "the pillar shaped honeycomb structure portion 11 is mainly based on a silicon carbide-metal silicon composite" as used herein means that the pillar shaped honeycomb structure portion 11 contains 90% by mass or more of the silicon carbide-metal silicon composite (total mass) based on the entire honeycomb structure. Here, the silicon carbide-metal silicon composite contains silicon carbide particles as an aggregate and metal silicon as a bonding material for bonding the silicon carbide particles, and a plurality of silicon carbide particles are preferably bonded by metal silicon so as to form pores between the silicon carbide particles.

A ratio of a "mass of metal silicon as a bonding material" contained in the pillar shaped honeycomb structure portion 11 to the total of a "mass of silicon carbide particles as an aggregate" contained in the pillar shaped honeycomb structure portion 11 and a "mass of metal silicon as a bonding material" contained in the pillar shaped honeycomb structure portion 11 is preferably from 10 to 40% by mass, and more preferably from 15 to 35% by mass.

A shape of each cell in a cross section perpendicular to an extending direction of the cells 18 is not limited, but it is preferably a quadrangle, a hexagon, an octagon, or a combination thereof. Among these, the quadrangle and the hexagon are preferred, in terms of easily achieving both structural strength and heating uniformity.

Each of the partition walls 19 defining the cells 18 preferably has a thickness of from 0.1 to 0.3 mm, and more preferably from 0.15 to 0.25 mm. As used herein, the thickness of the partition wall 19 is defined as a length of a portion passing through the partition walls 19, among line segments connecting centers of gravity of the adjacent cells 18 in the cross section perpendicular to the extending direction of the cells 18.

The pillar shaped honeycomb structure portion 11 preferably has a cell density of from 40 to 150 $cells/cm^2$, and more preferably from 70 to 100 $cells/cm^2$, in the cross section perpendicular to the flow path direction of the cells 18. The cell density in such a range can increase the purification performance of the catalyst while reducing the pressure loss upon flowing of an exhaust gas. The cell density is a value obtained by dividing the number of cells by an area of one end face of the pillar shaped honeycomb structure portion 11 excluding the outer peripheral wall 12 portion.

The provision of the outer peripheral wall 12 of the pillar shaped honeycomb structure portion 11 is useful in terms of ensuring the structural strength of the pillar shaped honeycomb structure portion 11 and preventing a fluid flowing through the cells 18 from leaking from the outer peripheral wall 12. More particularly, the thickness of the outer peripheral wall 12 is preferably 0.05 mm or more, and more preferably 0.10 mm or more, and even more preferably 0.15 mm or more. However, if the outer peripheral wall 12 is too thick, the strength becomes too high, so that a strength balance between the outer peripheral wall 12 and the partition wall 19 is lost to reduce thermal shock resistance, and the heat capacity increases to generate a temperature difference between the inner peripheral side and the outer peripheral side of the outer peripheral wall, so that the heat impact resistance decreases. Therefore, the thickness of the outer peripheral wall 12 is preferably 1.0 mm or less, and more preferably 0.7 mm or less, and still more preferably 0.5 mm or less. As used herein, the thickness of the outer peripheral wall 12 is defined as a thickness of the outer peripheral wall 12 in a direction of a normal line to a tangential line at a measurement point when observing a portion of the outer peripheral wall 12 to be subjected to thickness measurement in the cross section perpendicular to the extending direction of the cells.

The partition walls 19 of the pillar shaped honeycomb structure portion 11 preferably have an average pore diameter of from 2 to 15 μm, and more preferably from 4 to 8 μm. The average pore diameter is a value measured by a mercury porosimeter.

The partition walls 19 may be porous. When the partition walls 19 are porous, the partition wall 19 preferably has a porosity of from 35 to 60%, and more preferably from 35 to 45%. The porosity is a value measured by a mercury porosimeter.

The pillar shaped honeycomb structure portion 11 is made of ceramics, and preferably has electrical conductivity. Electrical resistivity of the pillar shaped honeycomb structure portion 11 is not particularly limited as long as the pillar shaped honeycomb structure portion 11 can generate heat by Joule heat upon electrical conduction. The electrical resistivity is preferably from 0.1 to 200 Ωcm, and more preferably from 1 to 200 Ωcm. As used herein, the electrical resistivity of the pillar shaped honeycomb structure portion 11 is a value measured at 25° C. by a four-terminal method.

(1-2. Electrode Portion)

The honeycomb structure 10 according to an embodiment of the present invention includes a pair of electrode portions 13a, 13b on an outer surface of the outer peripheral wall 12 across a central axis of the pillar shaped honeycomb structure portion 11 so as to extend in a form of strip in the flow path direction of the cells 18. By thus providing the pair of electrode portion 13a, 13b, uniform heat generation of the honeycomb structure can be enhanced. It is desirable that each of the electrode portions 13a, 13b extends over a length of 80% or more, and preferably 90% or more, and more preferably the full length, between both end faces of the honeycomb structure, from the viewpoint that a current easily spreads in an axial direction of each of the electrode portions 13a, 13b. It should be noted that the honeycomb structure may not include the electrode portions 13a, 13b.

Each of the electrode portions 13a, 13b preferably has a thickness of from 0.01 to 5 mm, and more preferably from 0.01 to 3 mm. Such a range can allow uniform heat generation to be enhanced and the thermal shock resistance to be ensured. The thickness of each of the electrode portions 13a, 13b is defined as a thickness in a direction of a normal line to a tangential line at a measurement point on an outer surface of each of the electrode portions 13a, 13b when observing the point of each electrode portion to be subjected to thickness measurement in the cross section perpendicular to the extending direction of the cells.

The electric resistivity of each of the electrode portions 13a, 13b is lower than the electric resistivity of the pillar shaped honeycomb structure portion 11, whereby the electricity tends to flow preferentially to the electrode portions 13a. 13b, and the electricity tends to spread in the flow path direction and the circumferential direction of the cells 18 during electric conduction. The electric resistivity of the electrode portions 13a, 13b is preferably $\frac{1}{10}$ or less, and more preferably $\frac{1}{20}$ or less, and even more preferably $\frac{1}{30}$ or less, of the electric resistivity of the pillar shaped honeycomb structure portion 11. However, if the difference in electric resistivity between both becomes too large, the current is concentrated between ends of the opposing electrode portions to bias the heat generated in the pillar shaped honeycomb structure portion 11. Therefore, the electric resistivity of the electrode portions 13a, 13b is preferably $\frac{1}{200}$ or more, and more preferably $\frac{1}{150}$ or more, and even more preferably $\frac{1}{100}$ or more, of the electric resistivity of the pillar shaped honeycomb structure portion 11. As used herein, the electric resistivity of the electrode portions 13a, 13b is a value measured at 25° C. by a four-terminal method.

Each of the electrode portions 13a, 13b may be made of conductive ceramics, a metal, and a composite of a metal and conductive ceramics (cermet). Examples of the metal include a single metal of Cr, Fe, Co, Ni, Si or Ti, or an alloy containing at least one metal selected from the group consisting of those metals. Non-limiting examples of the conductive ceramics include silicon carbide (SiC), metal compounds such as metal silicides such as tantalum silicide ($TaSi_2$) and chromium silicide ($CrSi_2$). Specific examples of the composite of the metal and the conductive ceramics (cermet) include a composite of metal silicon and silicon carbide, a composite of metal silicide such as tantalum silicide and chromium silicide, metal silicon and silicon carbide, and further a composite obtained by adding to one or more metals listed above one or more insulating ceramics such as alumina, mullite, zirconia, cordierite, silicon nitride, and aluminum nitride, in terms of decreased thermal expansion.

(2. Electrically Heating Support)

Figure 2:
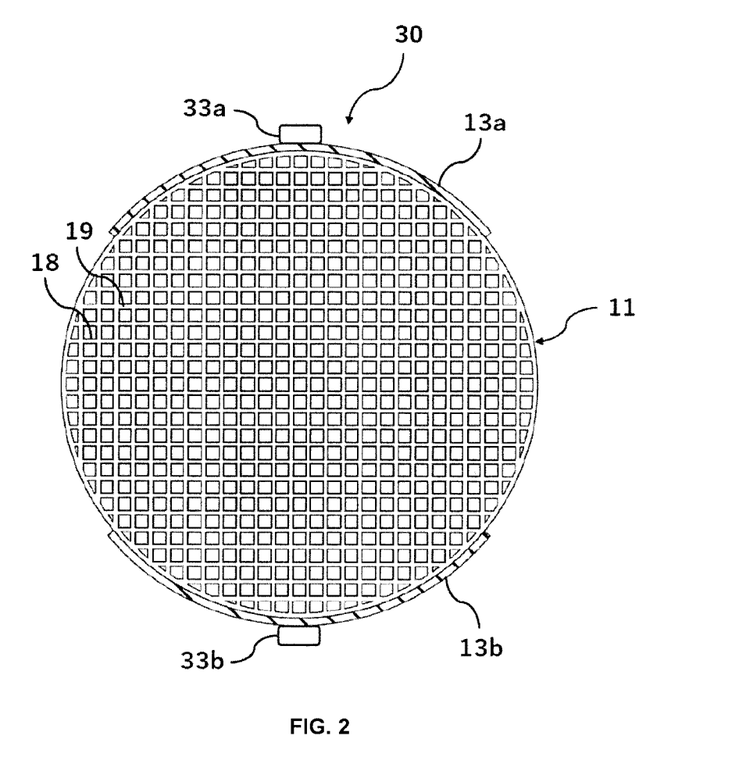
FIG. 2 is a schematic cross-sectional view of an electrically heating support according to an embodiment of the present invention, which is perpendicular to an extending direction of cells.

FIG. 2 is a schematic cross-sectional view of an electrically heating support 30 according to an embodiment of the present invention, which is perpendicular to the extending direction of the cells. The electrically heating support 30 includes: the honeycomb structure 10; and metal electrodes 33a, 33b electrically connected to the electrode portions 13a, 13b of the honeycomb structure 10, respectively.

(2-1. Metal Electrode)

Metal electrodes 33a, 33b are provided on the electrode portions 13a, 13b of the honeycomb structure 10. The metal electrode 33a, 33b may be a pair of metal electrode such that one metal electrode 33a is disposed so as to face the other metal electrode 33b across the central axis of the pillar shaped honeycomb structure portion 11. As a voltage is applied to the metal electrodes 33a, 33b through the electrode portions 13a, 13b, then the electricity is conducted through the metal electrodes 33a, 33b to allow the pillar shaped honeycomb structure portion 11 to generate heat by Joule heat. Therefore, the electrically heating support 30 can also be suitably used as a heater. The applied voltage is preferably from 12 to 900 V, and more preferably from 48 to 600 V, although the applied voltage may be changed as needed.

The material of the metal electrodes 33a, 33b is not particularly limited as long as it is a metal, and a single metal, an alloy, or the like can be employed. In terms of corrosion resistance, electrical resistivity and linear expansion coefficient, for example, the material is preferably an alloy containing at least one selected from the group consisting of Cr, Fe, Co, Ni and Ti, and more preferably stainless steel and Fe—Ni alloys. The shape and size of each of the metal electrodes 33a, 33b are not particularly limited, and they can be appropriately designed according to the size of the electrically heating support 30, the electrical conduction performance, and the like.

By supporting the catalyst on the electrically heating support 30, the electrically heating support 30 can be used as a catalyst. For example, a fluid such as an exhaust gas from a motor vehicle can flow through the flow paths of the plurality of cells 18 of the honeycomb structure 10. Examples of the catalyst include noble metal catalysts or catalysts other than them. Illustrative examples of the noble metal catalysts include a three-way catalyst and an oxidation catalyst obtained by supporting a noble metal such as platinum (Pt), palladium (Pd) and rhodium (Rh) on surfaces of pores of alumina and containing a co-catalyst such as ceria and zirconia, or a NOx storage reduction catalyst (LNT catalyst) containing an alkaline earth metal and platinum as storage components for nitrogen oxides ($NO_x$). Illustrative examples of a catalyst that does not use the noble metal include a NOx selective reduction catalyst (SCR catalyst) containing a copper-substituted or iron-substituted zeolite, and the like. Further, two or more catalysts selected from the group consisting of those catalysts may be used. A method for supporting the catalyst is not particularly limited, and it can be carried out according to a conventional method for supporting the catalyst on the honeycomb structure.

(3. Method for Producing Honeycomb Structure)

Next, a method for producing the honeycomb structure 10 according to an embodiment of the present invention will be described.

The method for producing the honeycomb structure 10 according to an embodiment of the present invention includes: a forming step of obtaining a honeycomb formed body; a drying step of obtaining a honeycomb dried body; and a firing step of obtaining a honeycomb fired body.

(Forming Step)

In the forming step, first, a forming raw material containing conductive ceramics is prepared. The forming raw material is prepared by adding metal silicon powder (metal silicon), a binder, a surfactant(s), a pore former, water, and the like to silicon carbide powder (silicon carbide). It is preferable that a mass of metal silicon is from 10 to 40% by mass relative to the total of mass of silicon carbide powder and mass of metal silicon. The average particle diameter of the silicon carbide particles in the silicon carbide powder is preferably from 3 to 50 µm, and more preferably from 3 to 40 µm. The average particle diameter of the metal silicon (the metal silicon powder) is preferably from 2 to 35 µm. The average particle diameter of each of the silicon carbide particles and the metal silicon (metal silicon particles) refers to an arithmetic average diameter on volume basis when frequency distribution of the particle size is measured by the laser diffraction method. The silicon carbide particles are fine particles of silicon carbide forming the silicon carbide powder, and the metal silicon particles are fine particles of metal silicon forming the metal silicon powder.

Examples of the binder include methyl cellulose, hydroxypropylmethyl cellulose, hydroxypropoxyl cellulose, hydroxyethyl cellulose, carboxymethyl cellulose, polyvinyl alcohol and the like. Among these, it is preferable to use methyl cellulose in combination with hydroxypropoxyl cellulose. The content of the binder is preferably from 2.0 to 10.0 parts by mass when the total mass of the silicon carbide powder and the metal silicon powder is 100 parts by mass.

The content of water is preferably from 20 to 60 parts by mass when the total mass of the silicon carbide powder and the metal silicon powder is 100 parts by mass.

The surfactant that can be used includes ethylene glycol, dextrin, fatty acid soaps, polyalcohol and the like. These may be used alone or in combination of two or more. The content of the surfactant is preferably from 0.1 to 2.0 parts by mass when the total mass of the silicon carbide powder and the metal silicon powder is 100 parts by mass.

The pore former is not particularly limited as long as the pore former itself forms pores after firing, including, for example, graphite, starch, foamed resins, water absorbing resins, silica gel and the like. The content of the pore former is preferably from 0.5 to 10.0 parts by mass when the total mass of the silicon carbide powder and the metal silicon powder is 100 parts by mass. An average particle diameter of the pore former is preferably from 10 to 30 µm. The average particle diameter of the pore former refers to an arithmetic average diameter on volume basis when frequency distribution of the particle size is measured by the laser diffraction method. When the pore former is the water absorbing resin, the average particle diameter of the pore former refers to an average particle diameter after water absorption.

The resulting forming raw material is then kneaded to form a green body, and the green body is then extruded to prepare a honeycomb structure. The honeycomb formed body includes: the outer peripheral wall; and the partition walls which are disposed on the inner side of the outer peripheral wall and define the plurality of cells each extending from one end face to the other end face to form the flow path.

(Drying Step)

The resulting honeycomb formed body is then dried to obtain a honeycomb dried body. The drying step includes: a first drying step of subjecting the honeycomb formed body to dielectric drying at a frequency of from 2 to 200 MHz so that a moisture scattering rate of the honeycomb formed body after dielectric drying is from 30 to 85%; and after the first drying step, a second drying step of subjecting the honeycomb formed body having the moisture scattering rate of from 30 to 85% to hot air drying.

Figure 3:
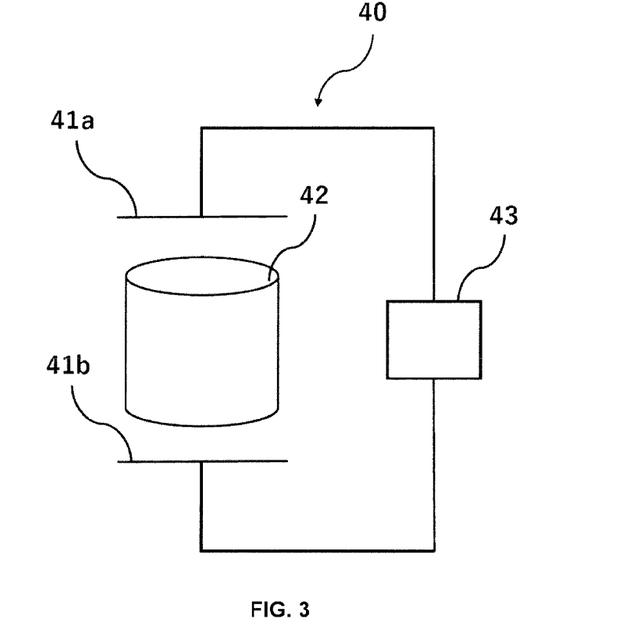
FIG. 3 is a schematic view of a dielectric drying device according to an embodiment of the present invention.

The dielectric drying is carried out using a dielectric drying device 40 as shown in FIG. 3. The dielectric drying device 40 includes: a pair of parallel plate electrodes 41a, 41b; and a high-frequency power supply 43 that is electrically connected to the pair of parallel plate electrodes 41a, 41b and applies high frequency between the electrodes. The dielectric drying method is carried out by placing a honeycomb formed body 42 between the pair of parallel plate electrodes 41a, 41b, and passing a high-frequency current between the electrodes, which causes polarized molecules to be excited as in a magnet to heating the honeycomb formed body due to internal heat generated by collision or rotation of the molecules to dry it.

The honeycomb structure used for EHC is generally designed to be conductive and have thin partition walls. In the production of the honeycomb structure having such a structure, the microwave drying of the honeycomb formed body may generate cracking and/or sagging in the honeycomb formed body. On the other hand, according to the dielectric drying method, a difference in moisture content between the central portion and the outer peripheral portion of the honeycomb formed body can be reduced because it is difficult to generate a difference in moisture scattering rate between the central portion and the outer peripheral portion of the honeycomb formed body. As a result, it is difficult to generate a difference in internal stress due to shrinkage, so that the generation of cracking and/or sagging during the drying step can be suppressed. However, if the honeycomb formed body is dried only by dielectric drying, the higher dielectric constant of silicon carbide, which forms a part of the material of the honeycomb formed body, may result in increased temperature irregularity within the honeycomb formed body and over-drying, so that quality may vary. Therefore, in the embodiment of the present invention, the honeycomb formed body is first dried by dielectric drying to control the honeycomb formed body to a predetermined moisture scattering rate, and the honeycomb formed body is then subjected to hot air drying. According to such a configuration, the honeycomb formed product is dried by dielectric drying in the first drying step to a predetermined moisture scattering rate (rough drying), followed by hot air drying in the second drying step (main drying), which can suppress the temperature irregularity inside the honeycomb formed product and the over-drying. As a result, variations in the quality of honeycomb formed body, such as drying shrinkage rate, outer diameter, cell structure, porosity, and resistivity, can be suppressed.

In the first drying step, the dielectric drying is carried out at a frequency of from 2 to 200 MHz. The frequency of 2

MHz or more can suppress generation of irregularity of the drying temperature, increase power supply, and improve a drying efficiency (moisture scattering in a unit time). The frequency of 200 MHz or less can suppress the generation of the irregularity of the drying temperature due to heating only near the surface of the formed body caused by excessive high frequency. The frequency of the dielectric drying in the first drying step is preferably from 10 to 150 MHz, and more preferably from 30 to 120 MHz.

The first drying step includes a step of controlling the moisture scattering rate of the honeycomb formed body after dielectric drying to 30-85%. If the moisture scattering rate of the honeycomb formed body after dielectric drying is less than 30%, the honeycomb formed body tends to be cracked or sagged in the subsequent hot air drying step, because of insufficient drying by dielectric drying. If the moisture scattering rate of the honeycomb formed body after dielectric drying is more than 85%, there is a risk of ignition in the subsequent hot air drying step because of excessive drying by dielectric drying. The moisture scattering rate of the honeycomb formed body after dielectric drying in the first drying step is preferably from 45 to 85%, and more preferably from 55 to 75%.

The control of the moisture scattering rate of the honeycomb formed body in the first drying step can be carried out by one or more of the following steps (1) to (3):

(1) Step of Controlling Interelectrode Distance Between Parallel Plate Electrodes of Dielectric Drying Device By controlling the interelectrode distance between the parallel plate electrodes 41a, 41b of the dielectric drying device 40 as shown in FIG. 3, the moisture scattering rate of the honeycomb formed body after dielectric drying can be controlled. Specifically, the interelectrode distance between the parallel plate electrodes 41a, 41b can be shortened, thereby increasing the moisture scattering rate of the honeycomb formed body. Also, the interelectrode distance between the parallel plate electrodes 41a, 41b can be increased, thereby reducing the moisture scattering rate of the honeycomb formed body. The interelectrode distance between the parallel plate electrodes 41a, 41b is not particularly limited and can be designed as needed depending on the desired moisture scattering rate. For example, it may be from 60 to 400 mm or from 100 to 300 mm.

(2) Step of Controlling Conveyance Speed of Honeycomb Formed Body

By controlling a conveyance speed of the honeycomb formed body in the first drying step, the moisture scattering rate of the honeycomb formed body can be controlled after dielectric drying. Specifically, a decreased conveyance speed of the honeycomb formed body can result in a longer conveyance time and an increased moisture scattering rate. On the other hand, an increased conveyance speed of the honeycomb formed body can results in a shorter conveyance time and a reduced moisture scattering rate. The conveyance speed of the honeycomb molding body is not particularly limited and it can be designed as needed depending on the desired moisture scattering rate. For example, the conveyance speed may be from 100 to 600 mm/min or from 150 to 300 mm/min.

(3) Step of Controlling Length of Cells in Flow Path Direction of Honeycomb Formed Body By controlling the length of the cells in the flow path direction of the honeycomb molded body produced in the forming step, the moisture scattering rate of the honeycomb formed body can be controlled after dielectric drying. Specifically, a longer length in the flow path direction of the cells of the honeycomb formed body can easily subject the honeycomb formed body to high frequency from the high-frequency power supply, resulting in an increased moisture scattering rate. A shorter length of the cells in the flow path direction of the honeycomb formed body can be difficult to subject the honeycomb formed body to high frequency from the high-frequency power supply, resulting in a reduced moisture scattering rate. The length of the cells in the flow path direction of the honeycomb formed body is not limited, and it may be designed as needed depending on the length of the cells in the flow path direction of the honeycomb structure to be produced. For example, the length may be from 50 to 200 cm or from 170 to 190 cm.

The first drying step preferably includes a step of controlling relative humidity in a dry atmosphere (dry atmosphere for dielectric drying) to be from 30 to 100%. The relative humidity of 30% or more in the dry atmosphere in the first drying step can result in gelation of the binder in the honeycomb formed body, thereby increasing the strength of the honeycomb formed body to suppress deformation. The relative humidity in the dry atmosphere in the first drying step is preferably from 60 to 100%, and even more preferably from 80 to 100%.

The step of controlling the relative humidity in the dry atmosphere in the first drying step can be controlled, for example, by covering the honeycomb formed body with a covering member and increasing the relative humidity inside the covering member due to the scattered moisture of the honeycomb formed body. In addition, the relative humidity in the covering member may be further increased by feeding steam into the covering member. The covering member is not limited as long as it can be placed over the honeycomb formed body and cover the entire honeycomb formed body, including, for example, a cup, a box, a sheet, and the like. The material of the covering member preferably has non-permeability to moderately prevent the scattered moisture of the honeycomb formed body from escaping to the outside, and more preferably has electrical insulation to prevent the electric field effected on the workpiece from changing. Also, it preferably has low cost and is flame retardant so that a fire does not spread even if an electrical discharge phenomenon occurs in the dielectric dryer. From this perspective, the material of the covering member is preferably a resin, especially a material such as Teflon (Registered trademark), vinyl chloride, and polypropylene.

The step of controlling the relative humidity in the dry atmosphere in the first drying step may be controlled by feeding moist steam around the honeycomb formed body. For example, by introducing moist steam into the device used for drying the honeycomb formed body, the moist steam is fed to the periphery of the honeycomb formed body, thereby controlling the relative humidity in the dry atmosphere.

In the second drying step, a temperature of the hot air used for hot air drying is preferably from 100 to 150° C. The temperature of the hot air of 100° C. or more can result in a shortened time required for a final finishing in the drying of the honeycomb formed body. The temperature of the hot air of 150° C. or less can suppress evaporation of the organic binder and the like other than water contained in the honeycomb formed body, so that deformation of the honeycomb formed body or combustion of the organic binder and the like can be suppressed.

In addition to the first drying step described above and the second drying step immediately after the first drying step, the drying step may also carry out drying by ventilation drying for intentionally pass hot air through the cells of the honeycomb dried body, or drying by radiation heat, or the like, after the second drying step. The air drying after the second drying step can allow drying to be carried out efficiently, so that the drying step can be completed in a shorter lead time while satisfactorily controlling the generation of cracking and sagging of the honeycomb formed body and variations in drying shrinkage rate.

(Firing Step)

The resulting honeycomb dried body is then fired to obtain a honeycomb fired body. As the firing conditions, the honeycomb dried body is preferably heated in an inert atmosphere such as nitrogen or argon at 1400 to 1500° C. for 1 to 20 hours. After firing, an oxidation treatment is preferably carried out at 1200 to 1350° C. for 1 to 10 hours in order to improve durability. The methods of degreasing and firing are not particularly limited, and they can be carried out using an electric furnace, a gas furnace, or the like.

The honeycomb fired body may be used as a honeycomb structure as it is. The method for producing the honeycomb structure with electrode portions is carried out by, first, applying the electrode portion forming raw material containing ceramic raw materials to the side surface of the honeycomb dried body and drying it to form a pair of unfired electrode portions on the outer surface of the outer peripheral wall, across the central axis of the honeycomb dried body, so as to extend in the form of strip in the flow direction of the cells, thereby producing a honeycomb dried body with unfired electrode portions. Subsequently, as the above firing step, the honeycomb dried body with unfired electrode portions is fired to obtain a honeycomb fired honeycomb body having a pair of electrode portions. The honeycomb structure with the electrode portions is thus obtained.

The electrode portion forming raw material can be formed by appropriately adding and kneading various additives to raw material powder (metal powder, and/or ceramic powder, and the like) formulated according to required characteristics of the electrode portions. When each electrode portion is formed as a laminated structure, the joining strength between each metal terminal and each electrode portion tends to be improved by increasing an average particle diameter of the metal powder in the paste for the second electrode portion, as compared with an average particle diameter of the metal powder in the paste for the first electrode portion. The average particle diameter of the metal powder refers to an arithmetic average diameter on volume basis when frequency distribution of the particle diameter is measured by the laser diffraction method.

The method for preparing the electrode portion forming raw material and the method for applying the electrode portion forming raw material to the honeycomb dried body can be performed according to a known method for producing a honeycomb structure. However, in order to achieve lower electrical resistivity of the electrode portions than that of the honeycomb structure portion, it is possible to increase a metal content ratio or to decrease the particle diameter of the metal particles as compared with the honeycomb structure portion.

Before firing the honeycomb dried body with unfired electrode portions, the honeycomb dried body with unfired electrode portions may be dried. As the firing conditions for the honeycomb dried body with unfired electrode portions, the honeycomb dried body with unfired electrode portions is preferably heated in an inert atmosphere such as nitrogen and argon at 1400 to 1500° C. for 1 to 20 hours. After firing, an oxidation treatment is preferably carried out at 1200 to 1350° C. for 1 to 10 hours in order to improve durability. The methods of degreasing and firing are not particularly limited, and they can be carried out using an electric furnace, a gas furnace, or the like. The electrode portions may be formed by applying the electrode portion forming raw material to the honeycomb fired body after the honeycomb fired body is produced, and then drying and firing it, rather than by forming them on the honeycomb dried body.

(4. Method for Producing Electrically Heating Support)

In one embodiment of the method for the electrically heating support 30 according to the present invention, a metal electrode is electrically connected to each of the pair of electrode portions on the honeycomb structure 10. Examples of the connecting method includes laser welding, thermal spraying, ultrasonic welding, and the like. More particularly, a pair of metal electrodes are provided on the surfaces of the electrode portions across the central axis of the pillar shaped honeycomb structure portion 11. The electrically heating support 30 according to an embodiment of the present invention is thus obtained. According to such a structure, the interior of the honeycomb structure of the electrically heating support is controlled to a desired electrical resistivity distribution, so that it is possible to produce an electrically heating support having desired effects of reducing energy used to purify an exhaust gas, suppressing irregularity in the heat generation distribution to generate heat uniformly, and the like (5. Exhaust Gas Purifying Device)

The electrically heating support 30 according to the above embodiment of the present invention can be used for an exhaust gas purifying device. The exhaust gas purifying device includes the electrically heating support 30 and a metallic cylindrical member for holding the electrically heating support 30. In the exhaust gas purifying device, the electrically heating support can be installed in an exhaust gas flow path for allowing an exhaust gas from an engine to flow.

EXAMPLES

Hereinafter, Examples is illustrated for better understanding of the present invention and its advantages, but the present invention is not limited to these Examples.

Test Example 1

(1. Production of Green Body)

Silicon carbide (SiC) powder and metal silicon (Si) powder were mixed in a mass ratio of 80:20 to prepare a ceramic raw material. To the ceramic raw material were added hydroxypropylmethyl cellulose as a binder, a water absorbing resin as a pore former, and water to form a forming raw material. The forming raw material was then kneaded by means of a vacuum green body kneader to prepare a cylindrical green body. The content of the binder was 7 parts by mass when the total of the silicon carbide (SiC) powder and the metal silicon (Si) powder was 100 parts by mass. The content of the pore former was 3 parts by mass when the total of the silicon carbide (SiC) powder and the metal silicon (Si) powder was 100 parts by mass. The content of water was 42 parts by mass when the total of the silicon carbide (SiC) powder and the metal silicon (Si) powder was 100 parts by mass. The average particle diameter of the silicon carbide powder was 20 μm, and the average particle diameter of the metal silicon powder was 6 μm. The average particle diameter of the pore former was 20 μm. The average particle diameter of each of the silicon carbide powder, the metal silicon powder and the pore former refers to an arithmetic average diameter on volume basis, when measuring frequency distribution of the particle size by the laser diffraction method.

(2. Production of Honeycomb Formed Body)

The resulting cylindrical green body was formed using an extruder having a die structure to obtain a cylindrical honeycomb formed body in which each cell had a hexagonal shape in the cross section perpendicular to the flow path direction of the cells. The honeycomb formed body had a length of 180 mm, and a diameter of each end face of 86 mm.

(3. Preparation and Evaluation of Honeycomb Dried Body)

Honeycomb dried bodies were prepared by drying the resulting formed bodies at any of levels 1 to 9 listed in Table 1. For the dielectric drying at levels 1-4 and 7-9, the moisture scattering rate was controlled by setting the height of each electrode to 200 mm and the conveyance speed to 180 mm/min. The temperature of the hot air used in the hot air drying in the first drying step at level 6 was set to 120° C. The temperature of the hot air used for hot air drying in the second drying step was set to 120° C.

The honeycomb dried body obtained by each of the drying steps at levels 1 to 9 was visually observed, and a degree of cracking and sagging was determined as follows:

A: No cracking or sagging was observed.

B: There was at least one cell where a distance between the cell and the adjacent cell was 50 or more and less than 70, or 130 or more and less than 150, when the design value of the distance is 100.

C: There was at least one cell where the distance between the cell and the adjacent cell was less than 50 or 150 or more, when the design value of the distance is 100. Alternatively, there was one or more positions where the partition wall or the outer peripheral wall was cut.

level 1, which would cause some cracking and sagging of the honeycomb formed body. Also, when compared with the drying method at the level 1, the drying method at the level 7 has a lower frequency in the first drying step, and larger temperature irregularity in the honeycomb than that at the level 1, which would cause some cracking and sagging of the honeycomb formed body.

The drying methods at the levels 5 and 6 generated drying irregularity due to moisture scattering from the outer periphery of the honeycomb formed bodies, thereby generating sugging.

In the drying method at the level 3, the drying by dielectric drying was insufficient, so that the same cracking as in the drying method at the level 5 was generated.

DESCRIPTION OF REFERENCE NUMERALS 10 honeycomb structure
11 pillar shaped honeycomb structure portion
12 outer peripheral wall
13a, 13b electrode portion
18 cell
19 partition wall
30 electrically heating support
33a, 33b metal electrode
40 dielectric drying device
41a, 41b parallel plate electrode
42 honeycomb formed body
43 high-frequency power supply

The invention claimed is:

1. A method for producing a honeycomb structure, the method comprising:
    a forming step of extruding a forming raw material containing a ceramic raw material mainly based on silicon carbide and metal silicon to obtain a honeycomb formed body, the honeycomb formed body comprising: an outer peripheral wall; and a partition wall disposed on an inner side of the outer peripheral wall, the partition wall defining a plurality of cells, each cell of the plurality of cells extending from one end face to other end face to form a flow path;
    a drying step of drying the honeycomb formed body to obtain a honeycomb dried body; and
    a firing step of firing the honeycomb dried body to obtain a honeycomb fired body,
    wherein the drying step comprises:
    a first drying step of subjecting the honeycomb formed body to dielectric drying at a frequency of from 10 to

TABLE 1

| | First Drying Step | | | | Second Drying | |
| Level | Drying Method — | Frequency MHz | Relative Humidity % | Moisture Scattering Rate % | Step Drying Method — | Evaluation of Cracking/ Sagging A, B, C |
| --- | --- | --- | --- | --- | --- | --- |
| 1 | Dielectric Drying | 40 | 100 | 65 | Hot Air Drying | A |
| 2 | Dielectric Drying | 40 | 10 | 65 | Hot Air Drying | B |
| 3 | Dielectric Drying | 40 | 100 | 20 | Hot Air Drying | C |
| 4 | Dielectric Drying | 40 | 100 | 30 | Hot Air Drying | A |
| 5 | Microwave Drying | 2450 | 100 | 65 | Hot Air Drying | C |
| 6 | Hot Air Drying | — | 100 | 100 | — | C |
| 7 | Dielectric Drying | 2 | 100 | 65 | Hot Air Drying | B |
| 8 | Dielectric Drying | 10 | 100 | 65 | Hot Air Drying | A |
| 9 | Dielectric Drying | 200 | 100 | 65 | Hot Air Drying | A |

(4. Preparation of Honeycomb Fired Body)

The honeycomb dried bodies were fired in an Ar atmosphere at 1400° C. for 3 hours to prepare honeycomb structures.

(5. Discussion)

The drying methods at the levels 1, 2, 4, and 7 to 9 correspond to Examples of the present invention, while the drying methods at the levels 3, 5, and 6 correspond to Comparative Examples of the present invention.

In the drying methods at the levels 1, 2, 4, and 7 to 9, the generation of cracking and sagging of honeycomb formed bodies was suppressed. When compared with the drying method at the level 1, the drying method at the level 2 has decreased relative humidity in the first drying step, and slower progression of the curing of the binder than that at the 150 MHz so that a moisture scattering rate of a honeycomb formed body after dielectric drying is from 30 to 85%; and after the first drying step, a second drying step of subjecting a honeycomb formed body having the moisture scattering rate of from 30 to 85% to hot air drying.

2. The method according to claim 1, wherein the moisture scattering rate of the honeycomb formed body after dielectric drying is from 45 to 85%.

3. The method according to claim 1, wherein the first drying step further comprises a step of controlling relative humidity in a dry atmosphere to be from 30 to 100%.

4. The method according to claim 3, wherein the step of controlling the relative humidity in the dry atmosphere comprises a step of covering the honeycomb formed body with a covering member, and increasing the relative humidity in the covering member by scattered moisture of the honeycomb formed body.

5. The method according to claim 3, wherein the step of controlling the relative humidity in the dry atmosphere comprises a step of feeding moist steam around the honeycomb formed body.

6. The method according to claim 1, wherein the first drying step comprises a step of controlling an interelectrode distance between parallel plate electrodes used in the dielectric drying to control the moisture scattering rate of the honeycomb formed body after the dielectric drying.

7. The method according to claim 1, wherein the first drying step comprises a step of controlling a conveyance speed of the honeycomb formed body to control the moisture scattering rate of the honeycomb formed body after dielectric drying.

8. The method according to claim 1, wherein the first drying step comprises a step of controlling lengths of the plurality of cells of the honeycomb formed body produced in the forming step in a flow path direction to control the moisture scattering rate of the honeycomb formed body after dielectric drying.

9. The method according to claim 1, wherein the method for producing the honeycomb structure further comprises a step of preparing a honeycomb dried body with unfired electrode portions by applying an electrode portion forming raw material containing a ceramic raw material to a side surface of the honeycomb dried body, and drying it to form a pair of unfired electrode portions on an outer surface of the outer peripheral wall across a central axis of the honeycomb dried body so as to extend in a form of strip in the flow path direction of the plurality of cells, wherein the firing step is a step of firing the honeycomb dried body with unfired electrode portions to obtain a honeycomb structure having a pair of electrode portions.

10. A method for producing an electrically heating support, the method comprising a step of electrically connecting a metal electrode to each of the pair of electrode portions of the honeycomb structure produced by the method according to claim 9.

* * * * *